(12) United States Patent
Ahrens et al.

(10) Patent No.: US 9,132,860 B2
(45) Date of Patent: Sep. 15, 2015

(54) ARTICULATED VEHICLE WITH A JOINT BETWEEN THE VEHICLE PARTS

(71) Applicant: Hübner GmbH, Kassel (DE)

(72) Inventors: Ralf Ahrens, Hessisch Lichtenau (DE); Jan Hendrik Dicke, Baunatal (DE); Uwe Bittroff, Vellmar (DE); Jens Karasek, Kaufungen (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 14/093,960

(22) Filed: Dec. 2, 2013

(65) Prior Publication Data
US 2014/0153998 A1 Jun. 5, 2014

(30) Foreign Application Priority Data

Nov. 30, 2012 (EP) ..................................... 12008029

(51) Int. Cl.
*B62D 25/08* (2006.01)
*B60D 5/00* (2006.01)

(52) U.S. Cl.
CPC *B62D 25/08* (2013.01); *B60D 5/00* (2013.01); *Y10T 403/32606* (2015.01)

(58) Field of Classification Search
CPC ... Y10T 403/32606; B62D 25/08; B60D 5/00
USPC ............ 403/31, 34–39, 119; 280/403, 446.1, 280/455.1, 457
See application file for complete search history.

(56) References Cited

U.S. PATENT DOCUMENTS 3,326,576 A    6/1967   Kothmann
3,484,992 A * 12/1969   Blumenthal .................... 49/203

(Continued)

FOREIGN PATENT DOCUMENTS

CN    101168345 A    4/2008
DE    19706683 A1    7/1998

(Continued)

OTHER PUBLICATIONS

Russian Office Action and English translation dated Mar. 13, 2015 for co-pending application No. 2013152380/11(081723).

*Primary Examiner* — Gregory Binda
*Assistant Examiner* — Nahid Amiri
(74) *Attorney, Agent, or Firm* — Gifford, Krass, Sprinkle, Anderson & Citkowski, P.C.; Douglas L. Wathen

(57) ABSTRACT

An articulated vehicle has a joint between the vehicle parts. The joint includes two joint segments that are rotatable relative to each other. The joint includes a damping device configured in such a manner that in any angular position of the joint segments, the damping torque acting on the joint is substantially the same in a positive as well as in a negative direction of rotation at the moment of a reversal of the direction of rotation.

9 Claims, 6 Drawing Sheets

(56) References Cited

U.S. PATENT DOCUMENTS

| | | | |
|---|---|---|---|
| 3,616,881 A | 11/1971 | Nicholls | |
| 4,421,339 A * | 12/1983 | Hagin | 280/460.1 |
| 4,867,071 A | 9/1989 | Weber | |
| 5,137,107 A | 8/1992 | Uttenthaler | |
| 5,174,597 A | 12/1992 | Uttenthaler | |
| 5,282,644 A * | 2/1994 | Larson | 280/638 |
| 5,456,185 A | 10/1995 | Rother et al. | |
| 6,889,657 B2 * | 5/2005 | Ruesseler et al. | 123/446 |
| 7,338,060 B2 * | 3/2008 | Koch et al. | 280/403 |
| 7,364,000 B2 * | 4/2008 | Furukawa et al. | 180/227 |
| 7,993,232 B2 * | 8/2011 | Millar | 475/198 |
| 8,033,561 B2 * | 10/2011 | McCune | 280/455.1 |
| 2003/0234000 A1 | 12/2003 | Ruesseler et al. | |
| 2011/0065544 A1 | 3/2011 | Millar | |

FOREIGN PATENT DOCUMENTS

| | | |
|---|---|---|
| EP | 0233850 A1 | 8/1987 |
| EP | 2106934 A1 | 10/2009 |
| JP | S57167902 U | 10/1982 |
| JP | S63140137 U | 9/1988 |
| JP | 11-294534 | 10/1999 |
| SU | 1654101 A1 | 6/1991 |
| WO | WO-2010107370 A1 | 9/2010 |
| WO | WO-2011108976 A1 | 9/2011 |

* cited by examiner

ARTICULATED VEHICLE WITH A JOINT BETWEEN THE VEHICLE PARTS

CROSS REFERENCE TO RELATED APPLICATION

This application claims priority from European patent application Serial No. EP 12008029.6, filed Nov. 30, 2012, the entire content of which is incorporated herein in its entirety.

FIELD OF THE INVENTION

The invention relates to an articulated vehicle with a joint between the vehicle parts, wherein the joint includes two joint segments that are rotatable relative to each other, and wherein the joint comprises a damping device.

BACKGROUND OF THE INVENTION

Articulated vehicles with a vehicle joint with a damping device for damping the movements of the two vehicle parts connected by the vehicle joint during travel are known more specifically from road transport as so-called articulated buses. The vehicle joint hereby comprises two joint segments connected by a bearing, which allow such an articulated vehicle to bend in order to drive around a bend. One of the joint segments is connected to one vehicle part by way of metal rubber bearings, in order to allow pitch or to a small extent also rolling movements.

Such a vehicle comprises a damping device. The damping device itself typically includes two piston cylinder dampers, which are disposed on the vehicle joint on both sides of the center longitudinal axis of the vehicle or of the vehicle joint. Hereby, the piston is disposed on one joint segment and the cylinder on the other joint segment in a respectively rotatable manner. More specifically when the articulated vehicle is a so-called pusher vehicle, a control system is provided, which adjusts the rigidity of the vehicle joint depending amongst others on the steering angle, the position of the two vehicle parts relative to each other and the travel speed. This is because in a pusher vehicle it is the rearmost axis of the articulated vehicle that is driven. In so-called puller buses, the drive occurs by way of the last axis of the front vehicle part, the rear part being merely pulled like a trailer. In such puller vehicles, such complex systems for control of the joint are not required. Pusher vehicles are very widely used; in this respect, the joints including the control systems for the damping device of the joint have proven their worth.

However, the piston cylinder dampers are relatively bulky. Due to their size, such piston cylinder dampers currently in use are also heavy. When building articulated buses, one always aims to reduce their weight in order to save fuel, but also in order to increase the payload if necessary, or at least to keep it the same, especially since the weight of modern buses continuously increases due to additional assemblies such as ramps or air conditioning for example.

SUMMARY OF THE INVENTION

The object underlying the invention therefore consists in providing a damping device with two piston cylinder dampers, the damping properties of which are the same as that of piston cylinder dampers known from the prior art but with a smaller construction volume and a reduced weight.

The damping device is configured in such a manner that in any angular position of the joint segments relative to each other, the damping torque acting on the joint is substantially identical in the positive as well as in the negative direction of rotation at the moment of reversal of the direction of rotation. It should be noted that the piston cylinder dampers between the two joint segments are disposed on the joint segments on each side of the center longitudinal axis of the joint. When the two joint segments rotate relative to each other, one piston cylinder damper is located on the outer side and one piston cylinder damper on the inner side between the two bending joint segments, wherein this e.g. right piston cylinder damper shortens, whereas the e.g. left piston cylinder damper extends. It has turned out that the right piston cylinder damper, i.e. the piston cylinder damper that shortens, initiates a completely different damping torque curve from the left piston cylinder damper on the outer side of the vehicle joint, in that the initiated damping torques change depending on the angular position of the segments relative to each other and in accordance with the changing lever arm and the respectively effective surface area on the piston of the respective piston cylinder damper. The lever arm is the distance between the point of linkage of the piston cylinder damper to the joint segment and the center point of the rotational bearing, i.e. of the rotational axis. This distance is variable due to the movement of the point of linkage on a circular path around the rotational axis.

In accordance with the present invention, the damping device is configured in such a manner that in any angular position of the joint segments relative to each other, the damping torque acting on the joint is identical or substantially identical in the positive as well as in the negative direction of rotation at the moment of reversal of the direction of rotation. Therefore, both piston cylinder dampers apply the same torque in total, at the moment of reversal of the direction of rotation. Incidentally, this behavior also has an exceedingly positive influence on vehicle dynamics in that in a damping device according to the prior art, jumps occur in the damping torque curve, which lead to abrupt movements of the vehicle parts, which can only be compensated for by a complex control system.

The two piston cylinder dampers of a damping device having a smaller construction volume and lesser weight than those of the prior art are specifically characterized in that the two piston cylinder dampers themselves have means for adjusting the respective effective damping torque to be applied in such a manner that in any angular position of the two joint segments relative to each other the damping torque is substantially identical at the moment of reversal of the direction of rotation. This means that independently of the angular position, the total damping moment applied by both piston cylinder dampers taking into account the cylinder force and leverage is always substantially identical, but differs of course in the angular position. This means that the piston cylinder dampers of the damping device themselves have means by way of which at least an adjustment and ideally a match of the damping torque curves is achieved. In order to counteract the disadvantageous ratio between the lever arm and the cylinder force, it is proposed to provide at least one check valve in the piston with a flow direction from the cylinder side to the piston rod side for adjusting the effective damping moment of the two piston cylinder dampers. This means that the adjustment occurs purely mechanically. The thought behind this construction is that it has been discovered that the effective surface area on the one side of the piston is different from the effective surface area on the opposite side of the piston. In this context, in a conventional vehicle joint with an arrangement of customary piston cylinder dampers on both sides of the center longitudinal axis of the vehicle, when the right piston cylinder damper retracts, the left piston cylinder damper extends. In the right piston cylinder damper, it is the piston surface that acts, i.e. the surface that faces the cylinder bottom, whereas in the left piston cylinder damper, it is the annular surface that acts i.e. the piston surface minus the cross-section of the piston rod. In order to solve the problem of the different surface areas, it could be conceivable in this context to minimize the cross-section of the piston rod. However, it has turned out that the piston rod cannot be minimized so as to achieve a significant impact on the differences in damping torque between the two opposite piston cylinder dampers during a bending movement without losses in mechanical stability. However, with the arrangement of the at least one check valve, a compensation can occur in this respect, namely in that the damping force on the piston surface is reduced but remains the same on the ring surface. The free cross-section of the check valve hereby depends on the volume of the piston rod in the cylinder and the maximum movement speed of the piston in the cylinder. This means that if a high movement speed of the piston in the cylinder is applied, the check valve must be bigger.

Experience has shown that by arranging such a check valve, the influence of the piston cylinder dampers onto the damping torque curve of both piston cylinder dampers can become the mirror image of each other (mirrored relative to the 0° plane), without having to minimize the piston rod. The force and thus the influence on the damping torque of both piston cylinder dampers are equal only when the angle of rotation is 0°, i.e. when both joint segments are in a straight position relative to each other. Thus, between e.g. −40° and 0°, the damping torque curve of the one damper equals the damping torque curve of the other damper in the range between e.g. −40° to 0°. This means for example that at an angle of +40°, the damping torque caused by the left outer piston cylinder damper gets close to 0, whereas the damping torque initiated by the right cylinder reaches an almost maximal value, while in return at −40° the torque initiated by the left piston cylinder damper also almost reaches the maximal value and the right piston cylinder damper has almost no effect.

Since the volume flow to be displaced is reduced due to the check valve in the bottom of the piston, the volume of the storage space for the hydraulic fluid can also be minimized since only the differential volume must be moved through the hydraulic manifold. The differential volume is the volume that flows through the hydraulics controller minus the volume that flows through the check valve in the piston. It follows that the piston cylinder dampers according to the invention have a smaller constructional volume and a correspondingly lesser weight than in the prior art.

BRIEF DESCRIPTION OF THE FIGURES

In the following, the invention is exemplarily explained in more detail based on the drawings.

DETAILED DESCRIPTION OF THE INVENTION

Figure 8:
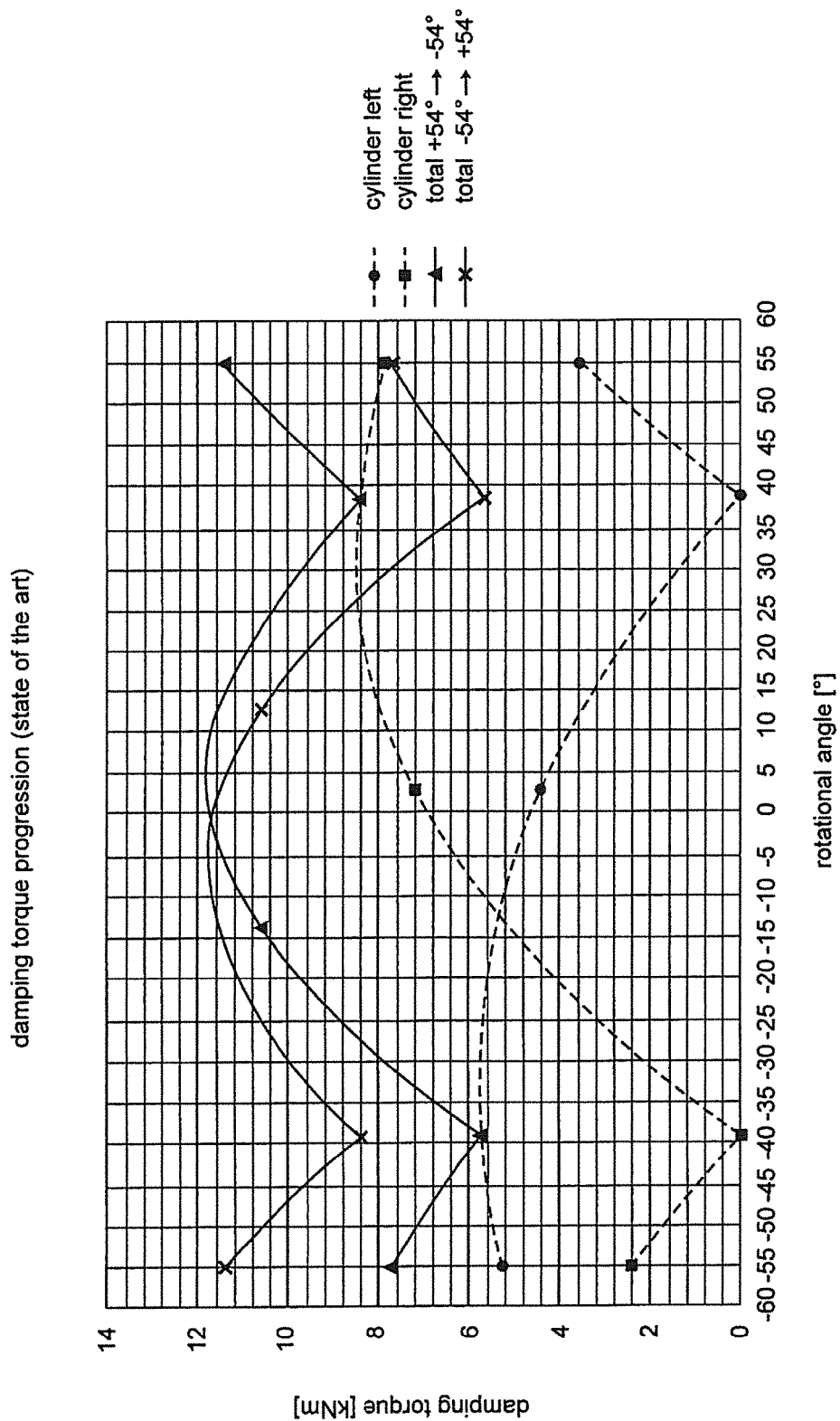
FIG. 8 schematically shows the damping torque curve in a piston cylinder damper with a conventional design.

According to FIGS. 1 to 4, the joint is labeled 1 and features the two joint segments 2 and 3. The two joint segments 2 and 3 are connected to each other by the rotational bearing 4, wherein the rotational bearing 4 centrically forms the virtual rotational axis of the joint 1. The piston cylinder dampers 10, 11 are located on both sides of the two joint segments 2, 3, wherein the piston cylinder damper 10 is disposed on the right side of the joint and the piston cylinder damper 11 is disposed on the left side of the joint, and wherein each piston cylinder damper is rotatably connected to the two joint segments. The two piston cylinder dampers 10, 11 form the damping device 13. Assuming that in the following explanations the left and right piston cylinder dampers are conventional piston cylinder dampers, i.e. such piston cylinder dampers that do not have a check valve in the piston with a flow direction toward the annular surface of the piston, the damping torque curve regarding the two piston cylinder dampers is such as shown in FIG. 8. The right cylinder visibly produces a completely different damping moment curve than the left cylinder. The course of the curve, which represents the addition of the damping torques from +54° to −54°, is here visibly completely different from the one going from −54° and +54°. This is substantially due to the fact that, as explained, the damping torque curves of the two piston cylinder dampers resulting from the damping forces combined with the corresponding lever arms HL, HR are different.

Figure 9:
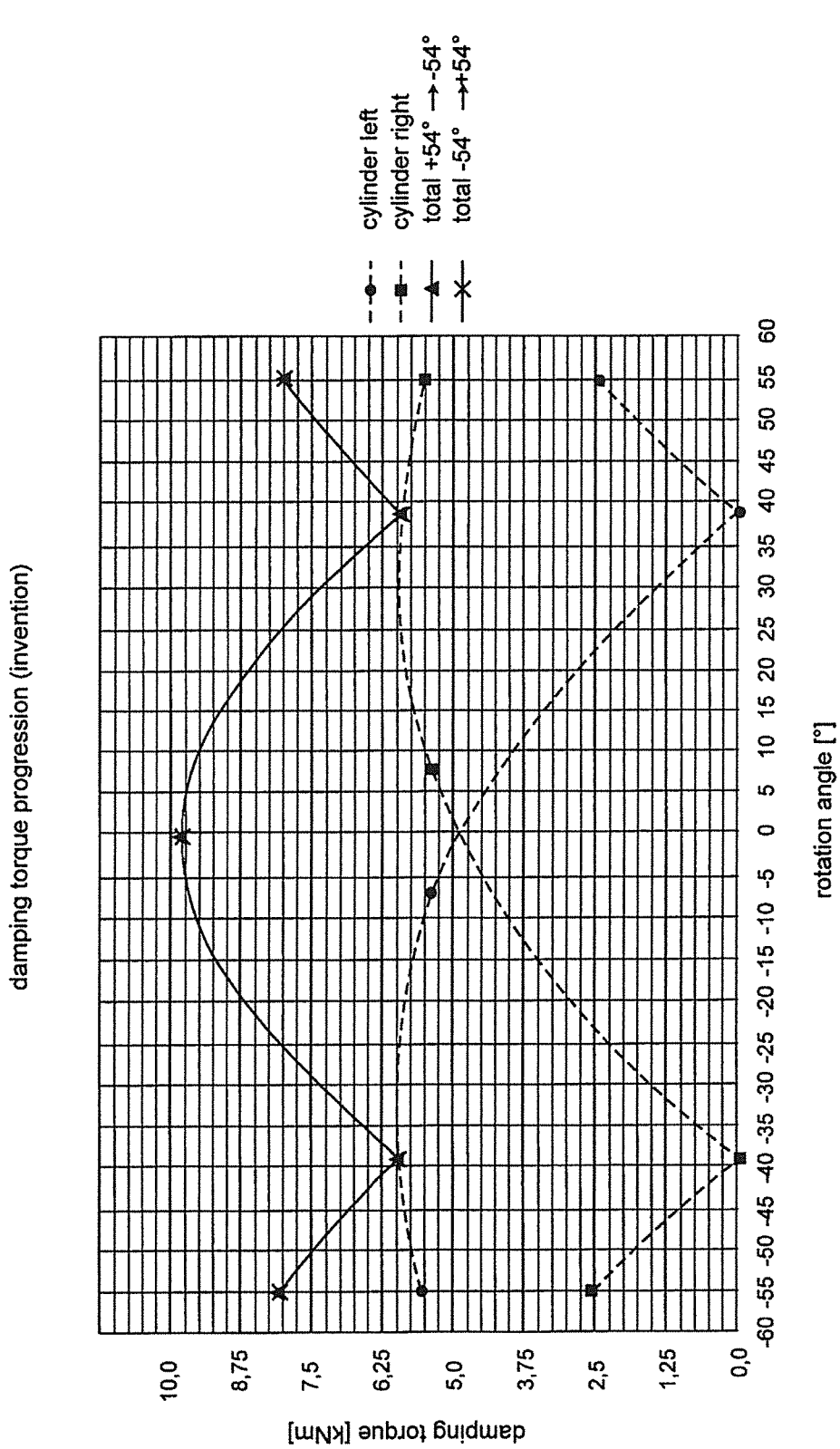
FIG. 9 schematically shows the damping torque curve of the piston cylinder damper with a check valve disposed in the piston.

In contrast, if one looks at FIG. 9, in which the piston cylinder dampers are equipped with pistons having a check valve with a flow direction toward the annular space or the annular surface of the piston, one can see that the damping torque curves, which result from the right cylinder as well as from the left cylinder, are the mirror image of each other. If one adds the values of the individual damping torques, one can see that the curves formed hereby are identical and thus superimposable from −54° to +54° as well as from +54° to −54°. This means that in each angular position, when the direction of rotation is reversed, the provided damping torque is always the same whether in a positive or in a negative direction of rotation of the joint. As has already been explained elsewhere, there are no torque jumps, which ultimately have a negative impact on the vehicle dynamics.

Figure 1:
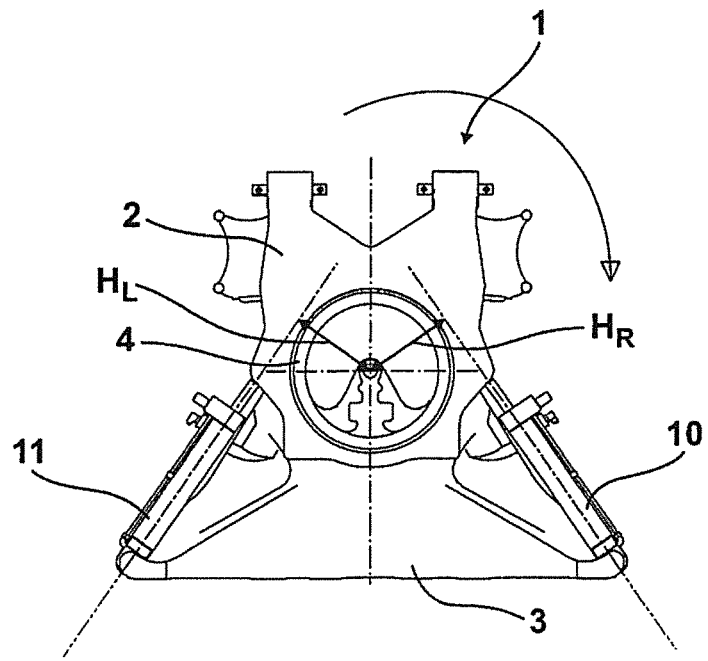
FIGS. 1 to 4 show a pivot joint of a vehicle with two joint segments in different angular positions of the joint segments relative to each other.
Figure 2:
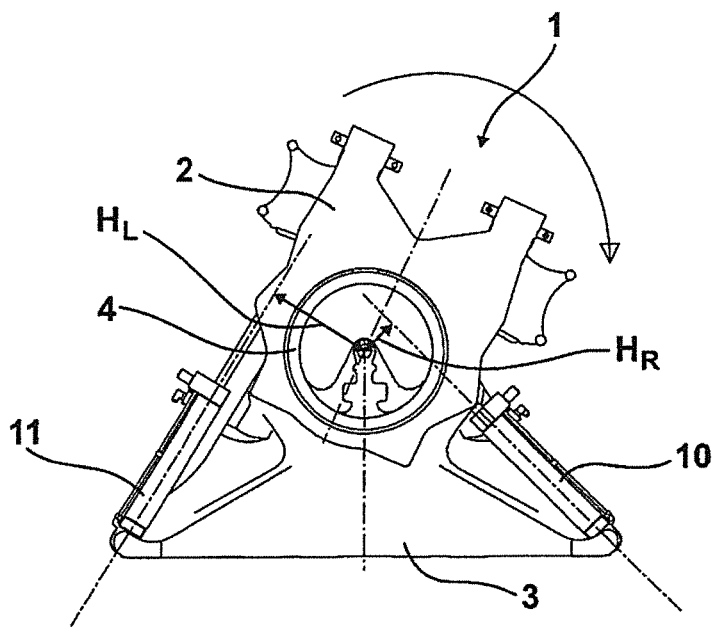
Figure 3:
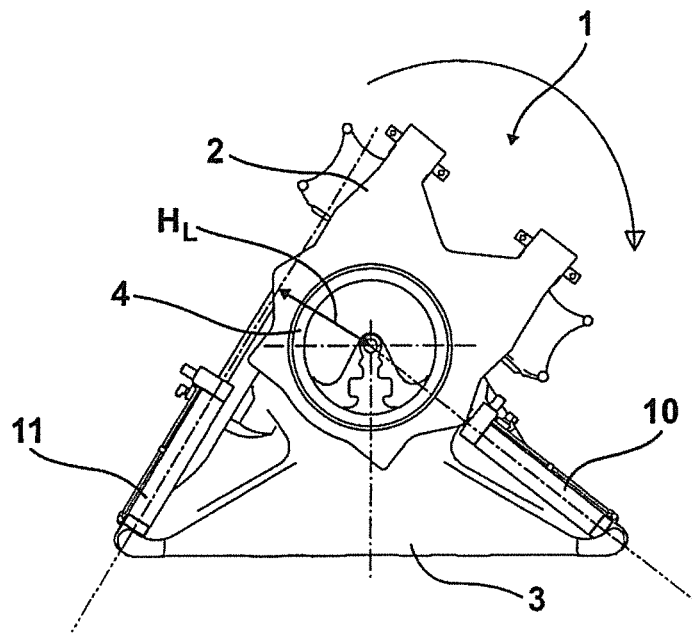
Figure 4:
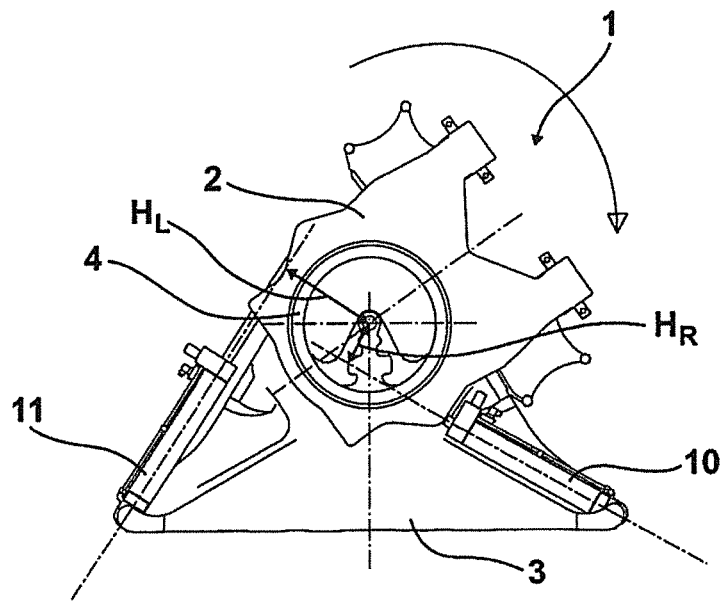
Figure 5:
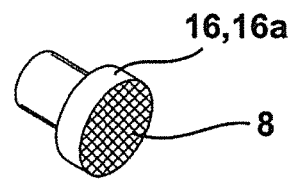
FIG. 5 schematically shows the piston surface of the piston of a piston cylinder damper.
Figure 6:
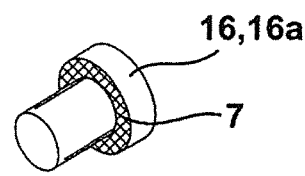
FIG. 6 shows the annular surface of the piston of a piston cylinder damper.
Figure 7:
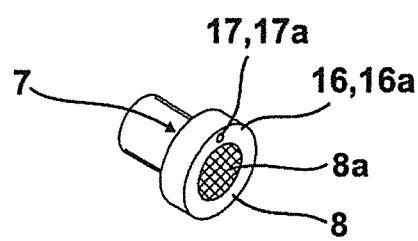
FIG. 7 shows the effective surface area of the piston of a piston cylinder damper with a check valve disposed in the piston.

This can be explained as follows: the effective surface area 7 of the piston on the side of the piston rod (annular surface) is smaller than the effective surface area 8 of the piston in the direction of the bottom of the cylinder (piston surface) by the cross-sectional surface area of the piston rod. The effects of the different surface areas 7, 8 at the same pressure are adjusted to each other by way of the check valve 17, 17a in such a manner that the forces resulting from the pressure and surface area are equal or at least adjusted. This means that the effective piston surface area in FIG. 7 is reduced approximately to the surface area 8a.

However, the movement speed of the piston in the cylinder, i.e. the volume to be displaced per time unit, is also significant for designing the check valve 17, 17a. If the movement speed is high, the check valve will have to be designed bigger with regard to the free cross-sectional surface area.

Figure 10:
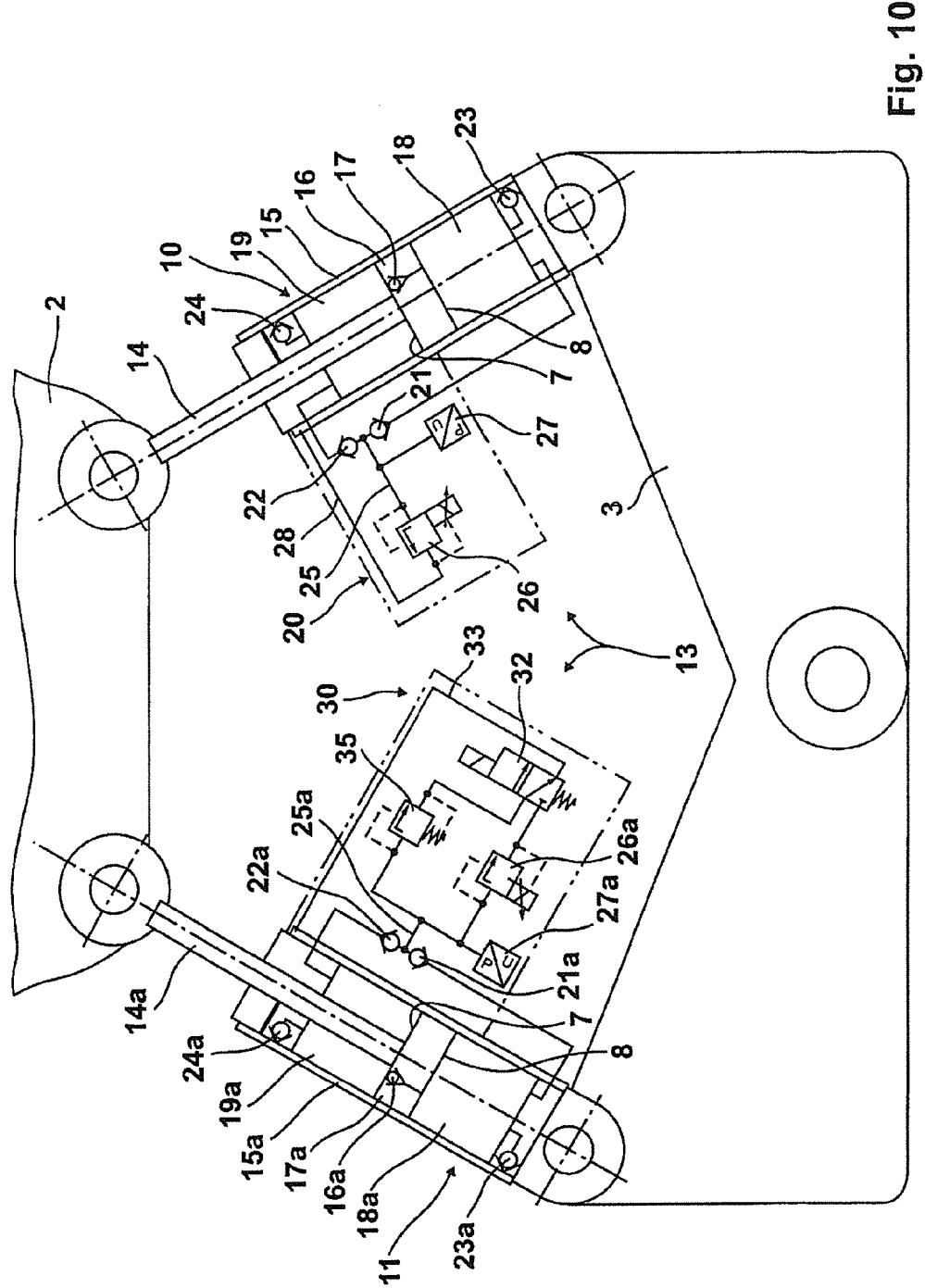
FIG. 10 shows the hydraulics controller of both piston cylinder dampers with an emergency damping of a piston cylinder damper.

The two piston cylinder dampers as shown in FIGS. 1 to 4 and labeled 10 and 11, each have their own hydraulics controller 20, 30 (FIG. 10). The two hydraulics controllers 20, 30 differ in that the hydraulics controller 30 allows for an emergency damping. If one first looks at the hydraulics controller 20 with the piston cylinder damper 10, one can see that the cylinder has a storage space 15 for storing the hydraulic fluid. The storage space is formed by an annular space around the cylinder; this means that the cylinder is double-walled. The volume of the storage space or annular storage depends on the volume of fluid to be displaced by way of the hydraulics controller. The piston itself is labeled 16, the check valve labeled 17 being located in the piston. The piston rod is labeled 14. The piston space, i.e. the space oriented toward the cylinder is labeled 18 and the annular space is labeled 19.

The left piston cylinder damper 11 in the figure has the same configuration, which is why the reference numbers have been complemented with the letter a.

The piston space 18, 18a as well as the annular space 19, 19a are respectively connected to the storage space 15, 15a by a check valve 23, 23a and 24, 24a. Two check valves 21, 21a and 22, 22a, which are disposed in opposite directions and also connect the piston space and the annular space to the hydraulics controller 20, 30 by way of the pipe 25, 25a, are also provided.

If one first looks at the hydraulics controller 20, one can see the proportional pressure relief valve labeled 26. This proportional pressure relief valve 26 is actuated by a control device (not shown). The pressure sensor labeled 27 is provided for monitoring. On the output side, the proportional pressure relief valve 26 is in turn connected to the storage space 15 by way of the pipe 28.

The hydraulics controller 30 also has such a proportional pressure relief valve, which is labeled 26a. The valve 35 is connected in parallel to that proportional pressure relief valve 26a and is configured as a pressure relief valve and connected, like the proportional pressure relief valve 26a, with the 3/2-way valve 32. On the output side, this 3/2-way valve 32 is in turn connected to the storage space 15a by way of the pipe 33.

Regarding the mode of operation, reference is first made to the hydraulics controller 20. Here, as has already been explained, the proportional pressure relief valve 26 is provided and the damping moment is therefore adjustable by way of the proportional pressure relief valve. Generating the damping force occurs in each direction of movement of the piston.

As has already been explained elsewhere, the hydraulics controller 30 comprises a so-called emergency damping in addition to the proportional pressure relief valve 26a. If the proportional pressure relief valve 26a fails, for example in case of a power failure, the flow toward the proportional pressure relief valve 26a is interrupted by the mechanical 3/2-way valve 32. This can also be actively triggered by the control device. This means that under the load of the spring, the 3/2-way valve mechanically closes the path to the proportional pressure relief valve 26a and opens the path to the pressure relief valve 35. This means that in case of a power failure, the hydraulics controller automatically switches into the "emergency damping" mode.

LIST OF REFERENCE NUMBERS 1 joint
2 joint segment
3 joint segment
4 rotational bearing
7 surface area of the piston on the piston rod side (annular surface)
8 surface area of the piston on the cylinder bottom side (piston surface)
10 piston cylinder damper
11 piston cylinder damper
13 damping device
14 piston rod
14a piston rod
15 storage space for the hydraulic fluid
15a storage space for the hydraulic fluid
16 piston
16a piston
17 check valve
17a check valve
18 piston space
18a piston space
19 annular space
19a annular space
20 hydraulics controller
21 check valve
21a check valve
22 check valve
22a check valve
23 check valve
23a check valve
24 check valve
24a check valve
25 pipe
25a pipe
26 proportional pressure relief valve
26a proportional pressure relief valve
27 pressure sensor
28 pipe
30 hydraulics controller
32 3/2-way valve
33 pipe
35 pressure relief valve

The invention claimed is:

1. A joint for an articulated vehicle having vehicle parts with the joint between the vehicle parts, the joint comprising:
   two joint segments that are rotatable relative to each other; and
   a damping device comprising two piston cylinder dampers, one piston cylinder damper being disposed on each side of the center longitudinal axis of the joint and extending between the two joint segments;
   each piston cylinder damper having a piston rod and a piston received in a cylinder, the cylinder having a bottom, the piston having a cylinder bottom side and an opposite piston rod side; and
   the piston of each piston cylinder damper having at least one check valve with a flow direction from the cylinder bottom side to the piston rod side so as to reduce the effective damping torque when the piston moves towards the cylinder bottom such that in any angular position of the joint segments, the total damping torque of the two piston cylinder dampers acting on the joint is substantially equal in a positive as well as in a negative direction of rotation.

2. The joint in accordance with claim 1, wherein:
   the two piston cylinder dampers each have an effective damping force that is adjustable such that in any angular position of the two joint segments relative to each other, the damping torque caused by the two piston cylinder dampers is substantially the same at the moment of a reversal of the direction of rotation.

3. The joint in accordance with claim 1, wherein:
the at least one check valve has a free cross-section, the free cross-section of the check valve depends on the volume of the piston rod in the cylinder and the maximum movement speed of the piston in the cylinder of the piston cylinder damper.

4. The joint in accordance with claim 1, wherein:
each piston cylinder damper includes a storage space on its circumference for the hydraulic fluid.

5. The joint in accordance with claim 1, wherein:
each piston cylinder damper includes a hydraulics controller.

6. The joint in accordance with claim 5, wherein:
the hydraulics controller includes a proportional pressure relief valve.

7. The joint in accordance with claim 5, wherein:
the hydraulics controller includes a pressure sensor.

8. The joint in accordance with claim 5, wherein:
one of the hydraulics controllers includes a pressure relief valve connected in parallel to the proportional pressure relief valve.

9. The joint in accordance with claim 8, wherein:
the hydraulics controller includes a 3/2-way valve connected in series to the pressure relief valve and the proportional pressure relief valve.

* * * * *